Figure 7:
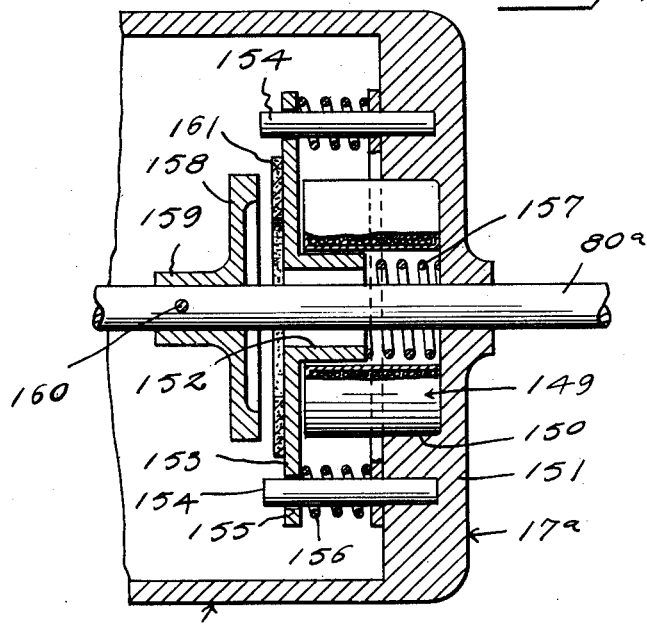

March 6, 1951 G. T. DOWNEY 2,544,448
MOTOR OPERATED VALVE SHAFT
Filed April 11, 1945 5 Sheets-Sheet 1
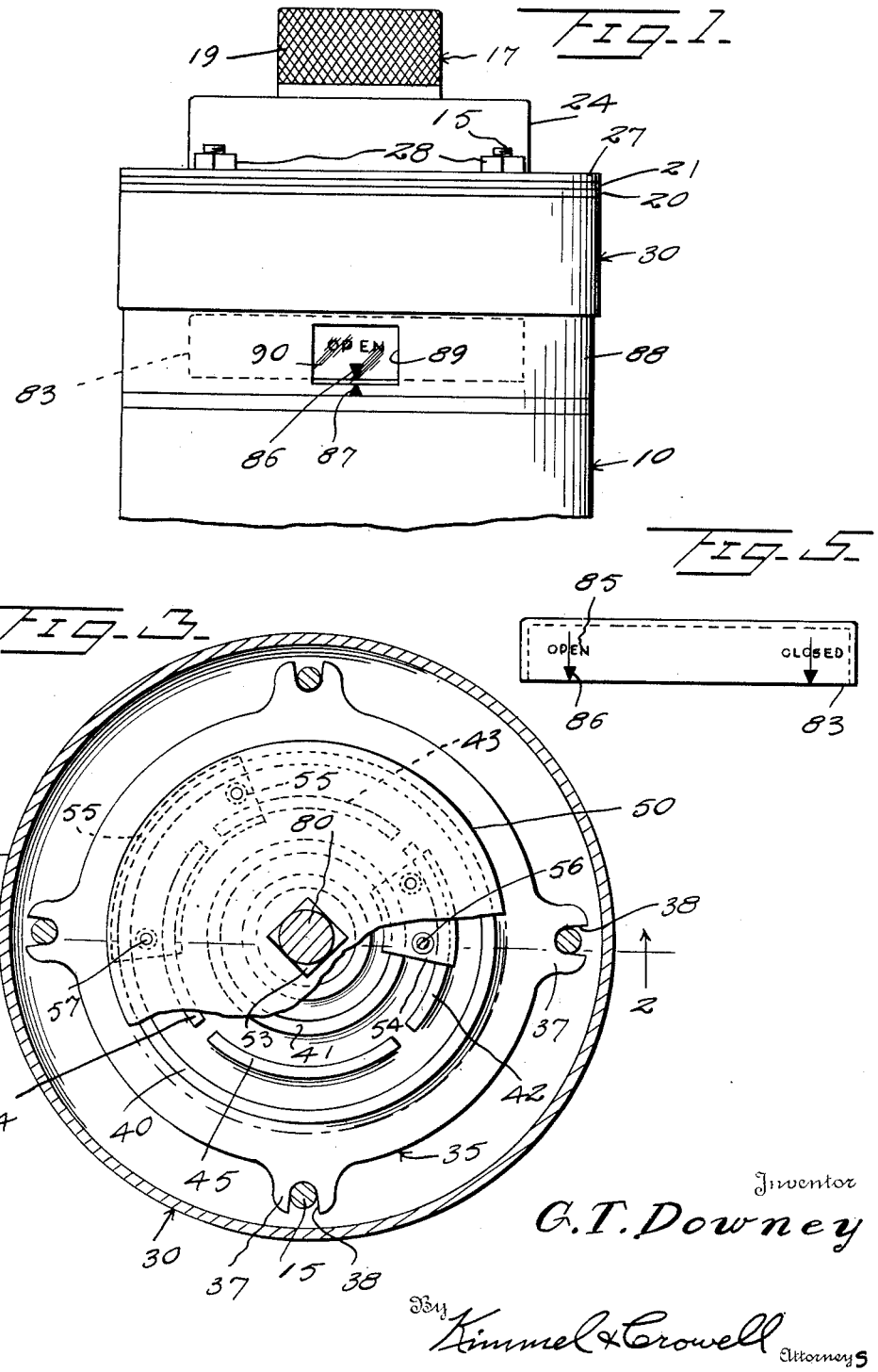

March 6, 1951　　　　G. T. DOWNEY　　　　2,544,448
MOTOR OPERATED VALVE SHAFT
Filed April 11, 1945　　　　　　　　　　　　5 Sheets-Sheet 2
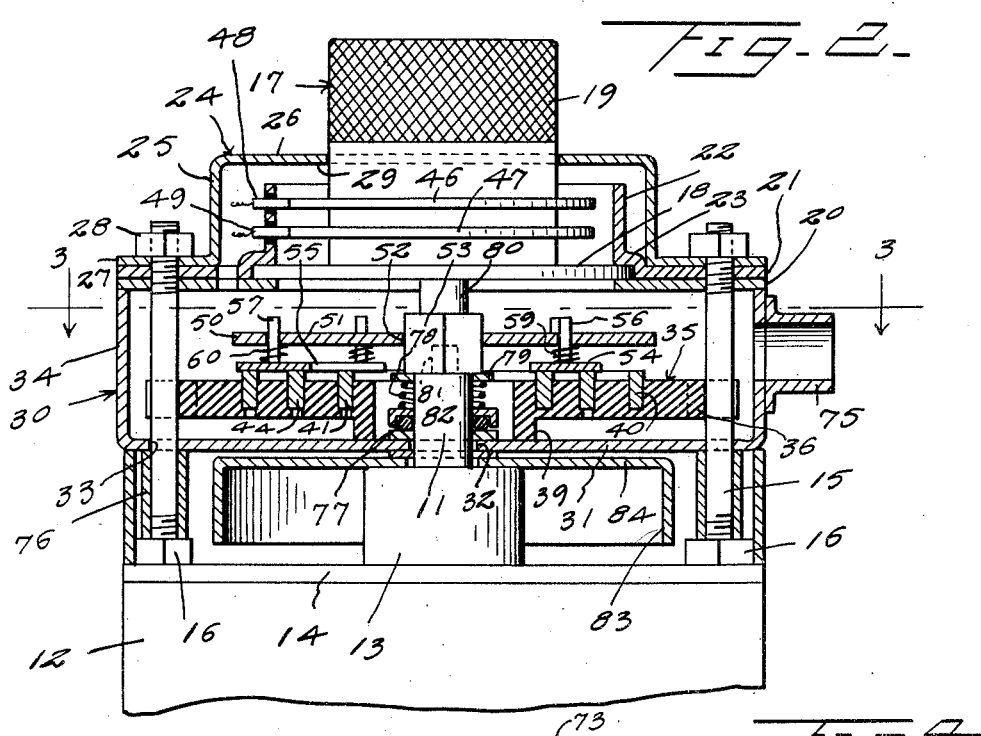
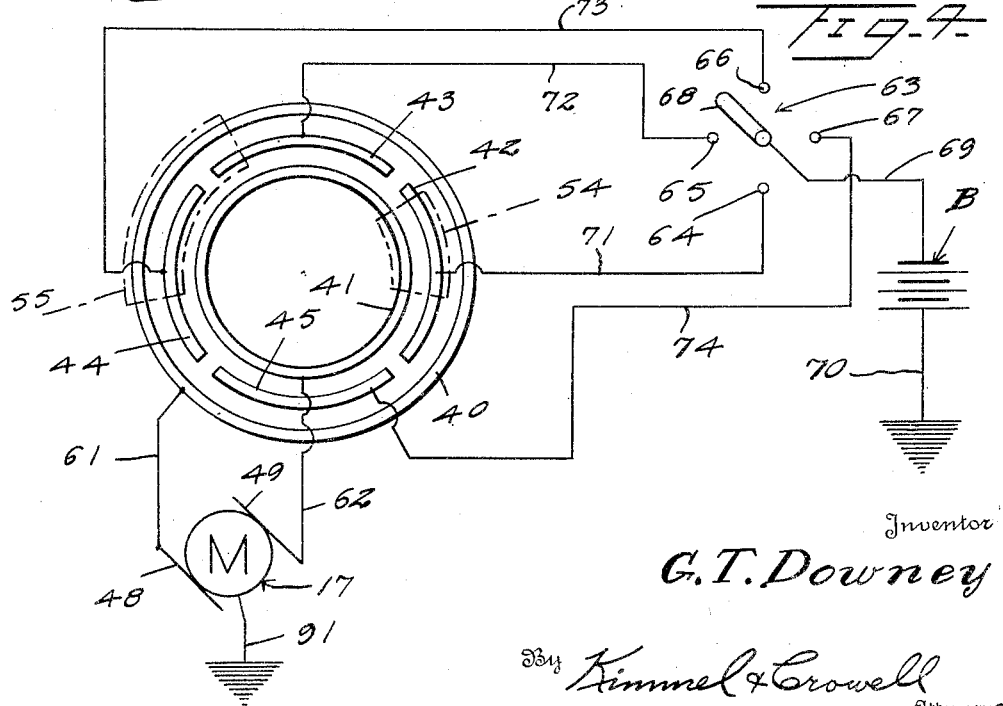
Inventor
G. T. Downey
By Kimmel & Crowell
Attorneys

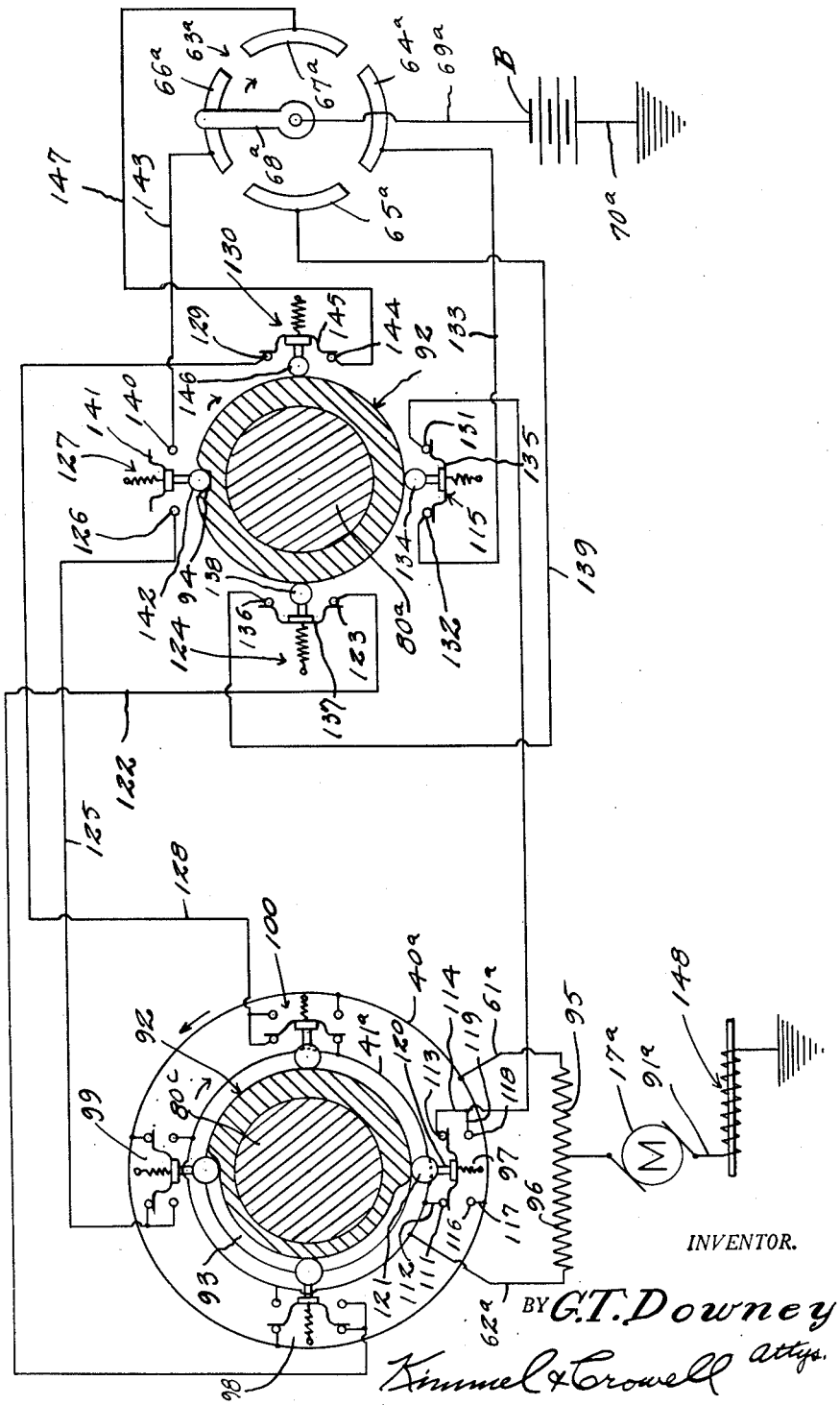

March 6, 1951 G. T. DOWNEY 2,544,448
MOTOR OPERATED VALVE SHAFT
Filed April 11, 1945 5 Sheets-Sheet 4

INVENTOR.
G. T. Downey
BY
Kimmel & Crowell attys.

March 6, 1951  G. T. DOWNEY  2,544,448
MOTOR OPERATED VALVE SHAFT
Filed April 11, 1945  5 Sheets-Sheet 5

INVENTOR.
G. T. Downey
BY
Kimmel & Crowell Attys.

Patented Mar. 6, 1951

2,544,448

UNITED STATES PATENT OFFICE 2,544,448

MOTOR OPERATED VALVE SHAFT

George T. Downey, Corry, Pa., assignor to Aero Supply Mfg. Co., Inc., Corry, Pa.

Application April 11, 1945, Serial No. 587,699

7 Claims. (Cl. 172—36)

This invention relates to electrically operated valves.

An object of this invention is to provide an electric operator for valves which may be used with either single or multiple port valves, which will automatically cut off when the valve plug has been moved to the desired position.

Another object of this invention is to provide an electric valve operator which may be mounted on various types of valves, and which includes means whereby the valve plug may be manually adjusted in addition to being electrically adjusted, so that the valve can be easily adjusted to any desired position when the electric supply fails.

A further object of this invention is to provide a construction of this kind which includes indicating means for showing the position of the valve plug.

To the foregoing objects and others which may hereinafter more fully appear, the invention consists of the novel construction, combination and arrangement of parts, as will be more specifically referred to and illustrated in the accompanying drawings, but it is to be understood that changes, variations, and modifications may be resorted to which fall within the scope of the invention as claimed.

Figure 8:
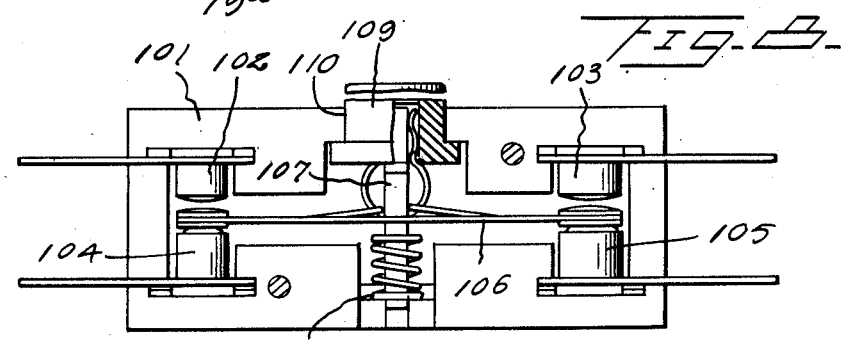
Figure 9:
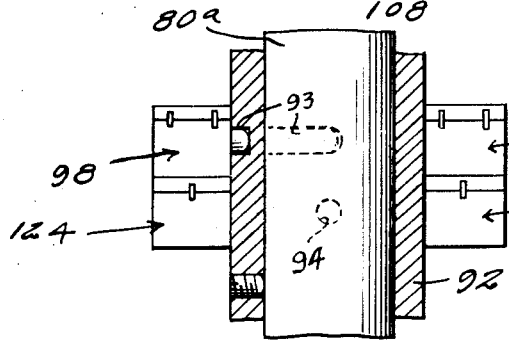

In the drawings:

Figure 1 is a detail side elevation, partly broken away, of a valve having an electric operator mounted thereon, constructed according to an embodiment of this invention, Figure 2 is a fragmentary longitudinal section through the device, Figure 3 is a sectional view taken on the line 3—3 of Figure 2, Figure 4 is a diagrammatic view, showing the electric circuits embodied with this invention, Figure 5 is a detail side elevation of the valve position indicating dial, Figure 6 is a diagrammatic view partly in section of a modified form of this invention, Figure 7 is a fragmentary sectional view of the electromagnetic brake used with the modification, Figure 8 is a side elevation partly broken away and in section of one of the double pole double throw switches used with this invention, the cover being removed from the switch housing, and Figure 9 is a fragmentary vertical section partly in detail showing the mounting of the switch structure on the motor shaft.

Figure 10:
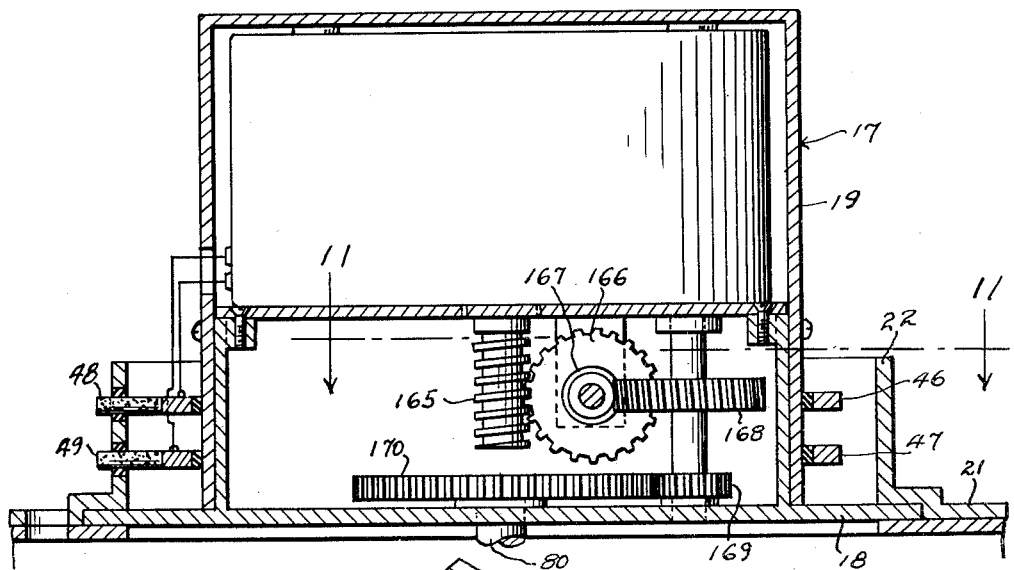
Figure 11:
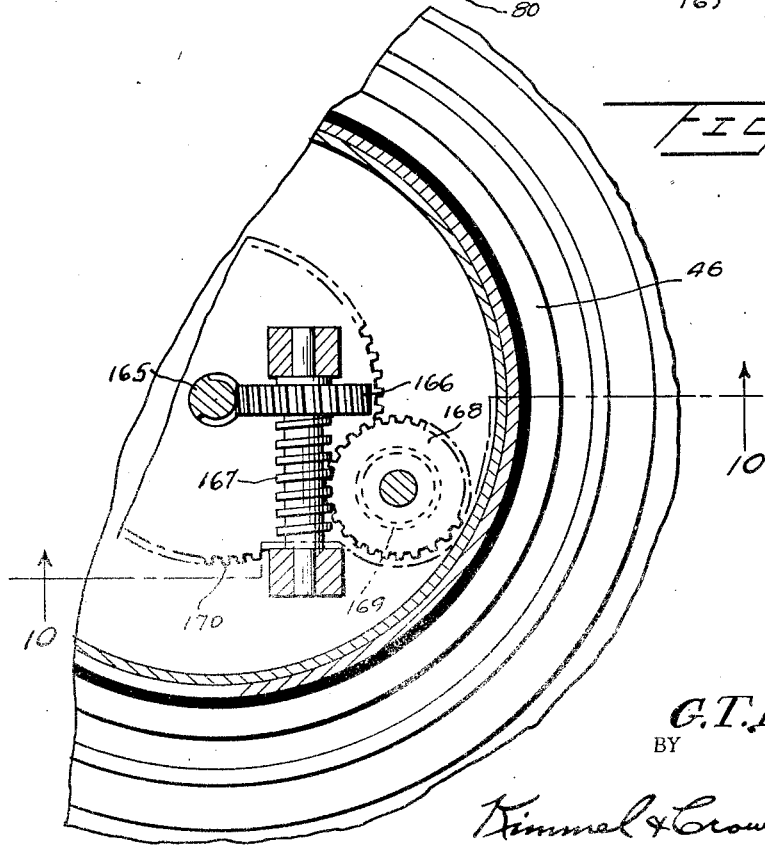

Figure 10 is a fragmentary sectional view on an enlarged scale, showing the electric motor and conventional reduction gearing used with this valve structure, taken on the line 10—10 of Figure 11, Figure 11 is a fragmentary sectional view taken on the line 11—11 of Figure 10.

Referring to the drawings, the numeral 10 designates generally a valve construction embodying a conventional valve structure, which may be either of the single type, or of the multiple port type, and which includes a valve plug shaft 11 rotatably carried by the housing 12. The shaft 11 extends through a boss 13 disposed centrally of a head 14, which is secured to one end of the housing 12.

The head 14 is secured on the housing 12 by means of a plurality of bolts 15, having nuts 16 threaded thereon. The bolts 15 are relatively long bolts projecting outwardly of the head 14, and provide a means for supporting the electric operator to be hereinafter described.

An electric motor generally designated as 17 is disposed coaxial with the valve plug shaft 11, and includes an annular flange 18 carried by the housing 19 for the motor. The flange 18 engages on an annular washer 20, which is mounted on the bolts 15 and a second washer, or annulus, 21 engages the outer side of the washer, or annulus, 20 and is also mounted on the bolts 15. The annulus 21 comprises a flange which is carried by a cylindrical brush carrier 22 disposed concentrically about the motor housing 19, and a shoulder 23 is formed at the junction between the cylindrical carrier 22 and the annulus, or flange, 21, the outer portion of the flange 18 being positioned between the shoulder 23 and the upper side of the washer 20.

In this manner the annulus 18 and the motor housing 19 may be frictionally held against rotation with respect to the valve structure 10. The degree of friction applied to annulus 18 is adjustable, so that, as will be hereinafter described, the housing 19 may be manually rotated, so as to manually adjust the position of the valve plug, whereas, under normal conditions the friction holding flange 18 against rotation is sufficient to prevent rotation of flange 18 and housing 19 when motor 17 is energized to electrically adjust the position of valve plug.

A cap 24 which includes a cylindrical side wall 25, an outer end wall 26 and an annular flange 27, engages about the carrier 22, the flange 27 of the cap being secured beneath nuts 28 threaded on the outer ends of the bolts 15. The cap 24 has an opening 29 in the end wall 26 thereof within which motor housing 19 loosely engages, so that this housing may, if desired, be manually rotated to adjust the valve plug position.

A contact housing, generally designated as 30, is mounted on the bolts 15 and includes an inner end wall 31, having an opening 32 through which the plug shaft 11 loosely engages. The end wall 31 is formed with openings 33 through which the bolts 15 are extended and the housing 30 includes a cylindrical side wall 34, which may be integral with the end wall 31 and which bears at its outer end against the inner side of annulus, or washer, 20.

A contact carrying plate generally designated as 35 is disposed within the housing 30 and includes an annular plate 36 of dielectric material which, as shown in Figure 3, is formed with a plurality of outwardly projecting ears 37, having slots 38 within which the bolts 15 are adapted to loosely engage. The plate 36 is formed with an annular rib 39, which bears against the inner side of the bottom wall 31 so as to space the plate 36 from the bottom wall 31. Plate 36 has mounted thereon an outer annular contact ring 40, and an inner annular contact ring 41. The plate 36 also has mounted thereon, or embedded therein a plurality of circumferentially spaced apart contact members 42, 43, 44 and 45.

The contact members 42 to 45 are positioned between the continuous contact rings 40 and 41, and provide a means whereby the electric circuit to the motor 17 may be interrupted when shaft 11 has turned to position the valve plug in a predetermined position and thereby stop the operation of the motor. The motor 17 has mounted on the housing 19 thereof a pair of commutator rings 46 and 47, which are connected to the motor 17 and are positioned within the brush carrier 22. A brush 48 is carried by the carrier 22 and engages commutator ring 46, and a second brush 49 is carried by the carrier 22 and engages commutator ring 47.

The motor 17 is preferably a reversible electric motor, one end of each field coil being grounded and the other ends of the field coils being connected to commutator rings 46 and 47. A contact carrier generally designated as 50 is disposed within the contact housing 20, and includes a plate 51 formed with a square or polygonal central opening 52, which engages a polygonal shaft portion 53, carried by the plug shaft 11, so that carrier 50 will be non-rotatable with respect to shaft 11. Carrier 50 includes a pair of segmental contact members 54 and 55, which are provided with upstanding pairs of pins 56 and 57, respectively, loosely engaging through the plate 50.

Springs 59 engage about the pins 56 and constantly urge the contact member 54 downwardly or inwardly, and springs 60 engage about pins 57 and constantly urge contact member 55 downwardly or inwardly. Contact member 54 is substantially shorter in length than contact member 55 and is mounted in a position to bridge the inner contact ring 41 and the intermediate contact segments 42 and 45. Contact member 55 is slightly less than a quarter circle, and is mounted in a position to bridge the outer contact ring 40 and the intermediate contact segments 42 to 45.

A conductor 61 is connected at one end to the outer contact ring 40 and at the other end to brush 48. A second conductor 62 is connected at one end to brush 49 and at the other end to inner contact ring 41.

In order to provide for the desired rotation of valve plug shaft 11, I have provided a manually adjustable switch structure generally designated as 63. The switch structure 63 includes a plurality of stationary contacts 64, 65, 66 and 67. A movable switch arm 68 is disposed in a position for selective engagement with one of the stationary contacts of the switch. Movable switch arm 68 is connected by means of a conductor 69 to one side of an electrical supply source, which may be a battery B, and the battery B may be connected at the opposite side, or pole, by means of a conductor 70 to the ground.

Intermediate contact member 42 is connected to switch contact 64 by means of a conductor 71, and intermediate contact member 43 is connected to switch contact 65 by means of a conductor 72. Intermediate conductor 44 is connected to switch contact 66 by means of a conductor 73, and intermediate contact 45 is connected by means of a conductor 74 to switch contact 67.

Contact housing 30 has secured thereto a connector nipple 75, through which the several conductors are adapted to extend for connection to the contact rings and the segmental contacts. Contact housing 30 is supported in outwardly spaced relation with respect to valve head 14 by means of sleeves 76, which are mounted about the bolts 15 and bear against the end wall 31 of the housing 30 and against the nuts 16.

A spring-pressed seal 77 is disposed about the shaft 11, within the housing 30, and a spring 78 is positioned about the shaft 11 bearing at one end against the seal 77, and at the other or outer end against a washer 79 positioned about the shaft 11. Preferably the polygonal portion 53 comprises a coupling means by means of which the motor shaft 80 may be coupled to the plug shaft 11. In other words, the polygonal end 53 of the shaft 80 is formed with a polygonal socket 81 within which the polygonal end 82 of the shaft 11 engages, so as to hold shaft 80 against rotation with respect to shaft 11.

In order to provide a visible indication as to the position of the valve plug, I have provided an indicator, which includes a cylindrical member 83, having an outer end wall 84, which may be keyed or otherwise fixed with respect to shaft 11, so that the indicator member may be rotated with shaft 11. The indicator member is provided with indicia 85 on the periphery thereof, which may be either the word "open" or "closed," and may include a pointer 86, which is adapted to be positioned in registry with a second pointer 87, carried by a cylindrical indicator housing 88. The indicator housing 88 is positioned about the bolts 15, bearing at its outer end against the inner end of contact housing 30, and bearing at its inner end against the head 14, outside of the bolts 15 and the nuts 16.

The indicator housing 88 is provided with a window opening 89, having a transparent panel 90 mounted therein for exposing the indicia, or legends, 85 and the pointer, or indicator, 86.

In the use and operation of this valve structure, the motor 17 has the field coils thereof grounded, as indicated at 91, and the switch 63 may be disposed remote from the valve, being connected thereto by the conductors 71 to 74, respectively. When it is desired to adjust the position of the valve plug, switch arm 68 is engaged with one of the stationary contacts 64 to 67. As an example, switch arm 68 may be engaged with contact 64, thereby closing the electric circuit to intermediate contact member 42. Bridging contact 54 being at this time in engagement with intermediate contact 42, will complete the electric circuit to the inner contact ring 41, so that motor 17 will operate to rotate valve plug shaft 11 in one direction. Assuming that motor 17 is now rotating in a counterclockwise direction, as viewed in Figure 4, contact carrier 50 will rotate with shaft 11 in a counterclockwise direction until bridging contact 54 rides off from intermediate contact 42. When this occurs motor 17 will stop, as intermediate contact member 43 is not in electric circuit with the supply source. It will, of course, be understood that shaft 80 of the motor has correlated therewith a reduction gearing of conventional construction such as a worm and worm wheel, which may be mounted within the motor housing 19, so that shaft 11 will be rotated by shaft 80 at a relatively slow speed. The reduction gearing embodies a worm 165 formed on the motor shaft, which engages a worm gear 166. A second worm 167 is connected with worm gear 166 and meshes with a second worm gear 168, a spur gear 169 is fixed relative to worm gear 168 and meshes with a large spur gear 170 on shaft 80.

The worm gear train shown in Figures 10 and 11 is a conventional reduction gearing of the type commonly used to provide great speed reduction with a minimum of gearing. This gearing provides a lock between the motor shaft worm 165 and the output or driven shaft 80 so that when the housing 19 is manually turned against the friction engaging the flange 18, small spur gear 169 will be locked against rotation with respect to spur gear 170. In this manner shaft 80 will rotate with housing 19 with the motor inoperative.

One use of the valve operator herein disclosed is in an airplane fuel line wherein a safety factor is provided, so that in the event of failure of the electric current the valve plug may be adjusted manually.

Assuming that it is desired to reverse the rotation of plug shaft 11 so as to bring the shaft back to its first mentioned position from which it was moved when switch arm 68 engaged contact 64, switch arm 68 is turned counterclockwise to engage contact 67. Contact 67 being connected to intermediate contact 45 will close the electric circuit from the supply source through conductor 74 to contact member 45, and as bridging member 55 is at this time in wiping engagement with contact member 45 and with contact ring 40, the reverse circuit is completed to motor 17 through conductor 61. The motor 17 will thereupon rotate reversely until bridging contact 55 breaks engagement with intermediate contact 45, and is substantially entirely engaged with de-energized contact 44.

In the event it is desired to manually adjust the position of the valve plug, the motor housing 19 may be grasped and forcibly rotated with respect to the valve structure. This is accomplished by reason of the frictional gripping of annular flange 18 between shoulder 23 and annulus 20 and the irreversible character of the reduction gearing conventionally used with electric motors driving valve shafts, where it is desired to effect a great speed reduction between the motor and the driven shaft. When motor housing 19 is manually rotated, the contact carrier 50 will rotate in the same manner as when the motor 17 is energized. In other words, contact carrier 50 will rotate when motor 17 is in circuit with the supply source through operation of the switch 63, or when motor 17 is manually rotated. This electric operator structure may be provided as an attachment for a conventional valve structure, it only being necessary to provide extended bolts similar to 15 for the head 14, whereupon the electric operator structure may be coupled to the valve plug shaft as hereinbefore described.

Referring now to Figures 6 to 9 inclusive, there is disclosed a modified form of this invention which is adapted to be connected to the valve stem or valve shaft of the valve structure in the manner hereinbefore described. The motor 17a has mounted on the motor shaft 80a thereof a switch operating cam sleeve, generally designated as 92. The sleeve 92 is formed with a substantially semi-circular groove 93 therein and is also formed at a point lengthwise spaced from the groove 93 with a narrow recess 94. A pair of circular contact rings 40a and 41a are mounted on a dielectric support or carrier, as hereinbefore described, and are connected to the field coils 95 and 96 by conductors 61a and 62a respectively.

A plurality of double pole double throw switches, generally designated as 97, 98, 99 and 100, are disposed in circumferentially spaced apart relation about the sleeve 92. The switches 97 to 100 are of like construction and are shown in greater detail in Figure 8. These switches comprise an insulated housing 101 which has mounted therein a pair of contact members 102 and 103 and a second or opposed pair of contact members 104 and 105 respectively. A bridging contact member 106 is disposed between the pairs of contact members and is actuated by movement of a contact operating bar 107. The bar 107 is spring pressed by means of a spring 108 for movement in one direction and has mounted on an end thereof an operating knob 109 which loosely projects through an opening 110 formed in the housing 101. The switch shown in detail in Figure 8 is identical with the switch construction shown in Patent No. 2,332,911, dated October 26, 1943. The switch 97 has one contact 111 thereof connected by means of a conductor 112 to the inner contact ring 41a. Switch 97 has the other contacts 113 of one pair connected by means of a conductor 114 to a double pole switch construction 115. The switch 97 also has a contact 116 of the other pair connected by means of a conductor 117 to the outer ring 40a. The other contact 118 of the other pair is connected by means of a contact 119 to conductor 114. The spring pressed switch operator 120 is provided with a ball or roller 121 which engages the sleeve 92 and is adapted to be moved by means of its operating spring into the groove 93 when the sleeve turns to position this groove in confronting position with respect to the ball or switch operating member 121.

The switches 98, 99 and 100 are connected to the contact rings 40a and 41a in the same manner as switch 97 and are connected to associated cut-off switches in the following manner: Switch 98 is connected by means of a conductor 122 to one pole 123 of a single acting switch 124. Switch 99 is connected by means of a conductor 125 to one pole 126 of a single acting switch 127. Switch 100 is connected by means of a conductor 128 to one pole 129 of a single acting switch 130. Switch 115 includes a contact 131, with which conductor 114 is connected, and also includes a contact 132, which is connected by means of a conductor 133 to a segmental contact member 64a, which is formed as part of switch 63a similar in every detail to switch 63. Switch 115 also includes a spring pressed operating member 134 which is urged into engagement with sleeve 92 and is connected to a resilient spring pressed bridging member 135 disposed between the two contacts 131 and 132. When sleeve 92 is rotated to position recess 94 in confronting position with respect to the ball or switch operator 134, the latter will be moved into the recess 94 by its spring and at this time bridging member 135 will by reason of its resiliency and bowed construction be moved to circuit breaking position and out of engagement with contacts 131 and 132. The switches 115, 124, 127 and 130 are similar to the construction shown in Figure 8 with the exception that only one pair of contacts are used.

Switch 124 includes a second contact 136 with a bridging member 137 spring pressed to engagement with the two contacts 123 and 136, and an operating member 138 is connected to the bridging member 137 and engages the periphery of sleeve 92. Contact 136 is connected by means of a conductor 139 to a segmental contact 65ª of switch 63ª.

Switch 127 includes a second contact 140 and a yieldable and spring pressed bridging member 141 is associated with the two contacts 126 and 140. A switch operating member 142 is operatively connected with the bridging member 41 and is adapted to engage in recess 94 when the latter is in confronting position with respect to the switch 127. Contact 140 is connected by means of a conductor 143 to a segmental contact 66ª of switch 63ª. Switch 130 includes a second contact 144 and a spring pressed and resilient bridging member 145. A switch operating member 146 is connected to the bridging member 145 and engages the periphery of the sleeve 192 until the latter is rotated to position recess 94 in registry with operator 146 whereupon the latter will be spring urged into recess 94 and bridging member 145 will be moved to circuit breaking position. Contact 144 is connected by means of a conductor 147 to a segmental contact 67ª forming part of the switch 63ª.

In the present instance in order to provide for the accurate positioning of the valve plug which is operated by the motor 17ª and to provide for the prompt stopping of rotation of the valve plug and the motor 17ª, I have provided an electromagnetic brake, generally designated as 148, which is interposed in the ground conductor 91ª. The electromagnetic brake 148 is shown in detail in Figure 7 and includes a solenoid coil 149 disposed about the motor shaft 80ª being mounted in a recess 150 formed in the adjacent end wall 151 of the motor housing 19ª. A hollow movable solenoid core 152 is disposed loosely within the interior of solenoid 148 and is formed with a relatively large annular flange or plate 153 which constitutes a braking plate. The plate 153 is held against rotation by means of at least a pair of pins 154 carried by the end wall 151 which loosely extends through openings 155 formed in the outer portion of plate 153. A spring 156 is disposed about each pin 154 and constantly urges plate 153 inwardly to braking position. An inner spring 157 is disposed within coil 148 and engages the core 152, so as to cooperate with springs 156 in moving the plate 153 to braking position. A braking plate 158 formed with a hub 159 is secured by means of a pin or fastening member 160 to shaft 80ª in a position confronting a fibrous braking element 161 which is carried by the inner face of plate 153. Solenoid coil 149 is adapted to be continuously energized when motor 17ª is operating and will be energized when either field coil 95 or field coil 96 is energized.

When coil 149 is energized, core 152 will be drawn into coil 149 against the tension of springs 156 and 157, so as to move braking element 161 out of engagement with braking plate 158 carried by motor shaft 80ª. When either of the field coils is de-energized solenoid coil 149 will also be de-energized and braking plate 153 will be moved inwardly under the tension of springs 156 and 157 so that braking element 161 will engage braking plate 158 on shaft 80ª. In this manner shaft 80ª will be promptly stopped in its rotation so that the valve plug being turned by the motor will be disposed in its predetermined position and will not over-ride the predetermined position.

In the use and operation of the structure shown in Figures 6 to 9 inclusive, when it is desired to adjust the position of the valve plug, switch 63ª is adjusted by swinging movable contact arm 68ª. Contact arm 68ª may be moved clockwise and this will effect clockwise rotation of motor shaft 80ª. Assuming that switch arm 68ª is swung clockwise to engage segmental contact 67ª, this will connect the battery B through conductor 69ª, switch arm 68ª and segment 67ª to conductor 147. Conductor 147 is connected to switch 130 and this switch, as shown in Figure 6, is in a circuit closing position. Switch 130 is also connected by means of conductor 138 to switch 100 which is in circuit closing position, as shown in Figure 6, with respect to inner contact ring 41ª. Field coil 96 will therefore be energized and motor shaft 80ª will be rotated in a clockwise direction. As soon as field coil 96 is energized, solenoid 148 will also be energized and solenoid core 152 with braking plate 153 will be moved to a released position. Shaft 80ª will thereupon be rotated clockwise until the operating member of switch 100 engages in the leading end of cam groove 93. At this time switch 100 will be operated to break the circuit to inner contact ring 41ª and to close the circuit to outer contact ring 40ª. At the same time that the operating member of switch 100 engages the leading end of cam groove 93, the recess 94 will be disposed in registry with operating member 146 of switch 130 and at this time bridging member 145 will upon operating member 146 entering recess 94 be moved to circuit breaking position. In the event the electromagnetic brake 148 should not promptly stop motor shaft 80ª so that recess 94 will move past operating member 146, then this operating member will be moved outwardly to engage the periphery of sleeve 92 and in its outermost position bridging member 145 will be moved inwardly to again engage contacts 129 and 144.

Inasmuch as switch member 100 is in circuit closing position to the reverse contact ring 40ª, motor 17ª will have the reversing field coil 95 energized so as to reversely rotate the motor shaft 80ª. In this manner the motor will be automatically operated to provide for the correct positioning of the motor shaft and any over-riding or over-running of the motor shaft and consequent over-running of the valve plug beyond its predetermined position will be prevented. In the diagrammatic view shown in Figure 6 the arrows adjacent the contact rings 40ª and 41ª indicate the rotation of the shaft 80ª when circuit is completed to either one of these contact rings.

What is claimed is:

1. A valve operator including a valve housing, a shaft, an electric motor coupled to said shaft, said motor including irreversible speed reducing gearing means supporting said motor from said housing, said supporting means including an annular flange carried by said motor, an annulus engaging one side of said flange, means fixedly supporting said annulus from said housing, and means frictionally clamping said flange on said annulus whereby said motor may be bodily rotated relative to said housing to thereby adjust the position of said shaft.

2. In a valve operator as set forth in claim 1 including a pair of commutator rings carried by said motor, and a pair of contact members carried by said latter named means engaging said rings.

3. In a valve operator as set forth in claim 1, including correlated circuit making and breaking means carried by said shaft and said housing for effecting partial rotation of said shaft.

4. In a valve operator as set forth in claim 1, including a dielectric plate disposed between said motor and said housing and fixed relative to the latter, inner and outer contact rings carried by said plate and connected to said motor, a plurality of circumferentially spaced apart contact segments fixed to said plate between said rings, a contact carrier fixed relative to said shaft, a bridging contact carried by said carrier and engaging said outer ring and said contact segments, and a second bridging contact carried by said carrier and engaging said inner ring and said contact segments.

5. A valve operator comprising a cylindrical casing having an inwardly directed flange at the top thereof, a shaft journalled in said casing, an electric motor operatively connected to said shaft, said motor including a housing having an outwardly directed annular flange thereon adapted to seat on said casing flange, an annular member seated on said casing flange and having a shoulder formed on the inner edge thereof and adapted to overlie and frictionally engage said housing flange, and adjustable means extending through said annular member and said casing flange and adapted to prevent rotation of said member relative to said casing flange and to provide means for varying the frictional engagement of said shoulder and said housing flange whereby said motor housing may be manually rotated relative to said casing.

6. In a valve structure having a housing and a valve plug shaft; a second housing fixed to said first housing and engaging about said shaft, a dielectric contact plate in said second housing, inner and outer circular contacts carried by said plate, circumferentially spaced apart arcuate contacts on said plate between said circular contacts a contact carrier fixed relative said shaft, a pair of spring-pressed bridging contacts carried by said carrier, one of said pair of contacts engaging said outer circular contact and progressively engageable with said arcuate contacts, the other one of said pair of contacts engaging the inner circular contact and also engaging selected ones of said arcuate contacts, a motor connected with said plug shaft and with said circular contacts, and means supporting said motor from said second housing.

7. In a valve structure having a housing and a valve plug shaft; a second housing fixed to said first housing and engaging about said shaft, a dielectric contact plate in said second housing, inner and outer circular contacts carried by said plate, circumferentially spaced apart arcuate contacts on said plate between said circular contacts, a contact carrier fixed relative said shaft, a pair of spring-pressed bridging contacts carried by said carrier, one of said pair of contacts engaging said outer circular contact and progressively engageable with said arcuate contacts, the other one of said pair of contacts engaging the inner circular contact and also progressively engageable with said arcuate contacts, a motor connected with said plug shaft and with said circular contacts, and means supporting said motor from said second housing, said latter named supporting means including an annular flange carried by said motor, and clamping means carried by said second housing engaging about said flange.

GEORGE T. DOWNEY.

REFERENCES CITED

The following references are of record in the file of this patent:

UNITED STATES PATENTS

| Number | Name | Date |
|---|---|---|
| 1,074,428 | Gil | Sept. 20, 1913 |
| 1,173,764 | Baldwin | Feb. 29, 1916 |
| 1,547,306 | Dunn | July 28, 1925 |
| 1,698,174 | Sauter | Jan. 8, 1929 |
| 2,044,025 | Windas | June 16, 1936 |
| 2,315,389 | Benson | Mar. 30 1943 |
| 2,318,010 | Panish | May 4, 1943 |
| 2,327,959 | Cerow | Aug. 24, 1943 |
| 2,387,533 | Schmucker | Oct. 23, 1945 |